United States Patent
Brutscher et al.

(10) Patent No.: US 7,467,524 B2
(45) Date of Patent: Dec. 23, 2008

(54) AIR-CONDITIONING SYSTEM AND A METHOD FOR THE PREPARATION OF AIR FOR THE AIR-CONDITIONING OF A SPACE

(75) Inventors: Norbert Brutscher, Lindenberg (DE); Joachim Haas, Wangen (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 100 days.

(21) Appl. No.: 10/977,250

(22) Filed: Oct. 29, 2004

(65) Prior Publication Data
US 2005/0188716 A1 Sep. 1, 2005

(30) Foreign Application Priority Data
Oct. 29, 2003 (DE) ............................... 103 50 541
Apr. 20, 2004 (EP) ............................... 04009312

(51) Int. Cl.
*F25D 9/00* (2006.01)
(52) U.S. Cl. .......................................... 62/402; 62/401
(58) Field of Classification Search .................. 62/401, 62/402
See application file for complete search history.

(56) References Cited

U.S. PATENT DOCUMENTS

| | | | |
|---|---|---|---|
| 4,487,034 A | | 12/1984 | Cronin et al. |
| 4,523,517 A | | 6/1985 | Cronin |
| 4,963,174 A | * | 10/1990 | Payne ............................. 62/87 |
| 5,461,882 A | * | 10/1995 | Zywiak ....................... 62/401 |
| 5,628,203 A | * | 5/1997 | Adolph et al. ................ 62/402 |
| 5,704,218 A | * | 1/1998 | Christians et al. ............. 62/172 |
| 5,956,960 A | * | 9/1999 | Niggeman .................... 62/172 |
| 6,205,803 B1 | * | 3/2001 | Scaringe ..................... 62/259.2 |
| 6,257,003 B1 | * | 7/2001 | Hipsky .......................... 62/88 |
| 6,526,775 B1 | * | 3/2003 | Asfia et al. .................... 62/402 |
| 6,681,592 B1 | * | 1/2004 | Lents et al. ................... 62/401 |
| 6,871,510 B2 | | 3/2005 | Haas |
| 7,000,425 B2 | * | 2/2006 | Army Jr. et al. ............... 62/401 |

(Continued)

FOREIGN PATENT DOCUMENTS

DE   10 139483   3/2003

(Continued)

*Primary Examiner*—William C Doerrler
(74) *Attorney, Agent, or Firm*—Dilworth & Barrese, LLP

(57) ABSTRACT

The present invention relates to an air-conditioning system, in particular an air-conditioning system for the air-conditioning of a passenger cabin of an airplane, having at least one heat exchanger arranged in a stagnation air passage for the cooling of compressed air and having at least one first shaft device and one second shaft device, with the heat exchanger including at least one first heat exchanger unit and one second heat exchanger unit separate from it on the compressed air side, which are arranged in the common stagnation air passage and of which a respective one is in communication on the compressed air side with a respective one of the shaft devices, with the shaft devices having compressors which are in respective communication on the outlet side with the inlet of the heat exchanger units on the compressed air side. The compressors are acted on by stagnation air or environmental air on the inlet side and are driven by means of one or more motors. The invention further relates to a method for the preparation of air for the air-conditioning of a space.

28 Claims, 6 Drawing Sheets

U.S. PATENT DOCUMENTS

2002/0113167 A1   8/2002   Albero et al.
2003/0177781 A1*  9/2003   Haas et al. .................... 62/402

FOREIGN PATENT DOCUMENTS

| | | |
|---|---|---|
| DE | 10201426 | 7/2003 |
| EP | 0888966 | 1/1999 |
| EP | 0891279 | 1/1999 |
| JP | 53-22300 | 3/1978 |
| WO | 99/02401 | 1/1999 |
| WO | 03/086859 | 10/2003 |

* cited by examiner

AIR-CONDITIONING SYSTEM AND A METHOD FOR THE PREPARATION OF AIR FOR THE AIR-CONDITIONING OF A SPACE

BACKGROUND OF THE INVENTION

The invention relates to an air-conditioning system, in particular an air-conditioning system for the air-conditioning of a passenger cabin of an airplane in accordance with the description herein. The invention further relates to a method for the preparation of air for the air-conditioning of a space, in particular for the air-conditioning of a passenger cabin of an airplane.

Air-conditioning systems for airplanes are known in numerous different embodiments. They in particular serve the heating and the cooling of the cabin, the cabin pressurization and the supply of fresh air. What is important is that the air-conditioning system has a construction size and a weight which are as low as possible, which is in particular of great interest in aircraft construction. Already known air-conditioning systems as a rule have a shaft device which includes a compressor and a turbine and which can additionally be provided with a blower arranged in a stagnation air passage. In already known systems, one or more heat exchangers are located in the stagnation air passage and serve to cool compressed air tapped from the engines or from auxiliary units. In already known systems, the compressed air is first cooled in a first heat exchanger in the stagnation air passage, is them compressed in the compressor of the shaft device, is cooled again in a second heat exchanger arranged in the stagnation air passage and is then supplied to a water extractor circuit. The air which has been dehumidified in this manner subsequently flows through the turbine of the shaft device and is then supplied to a mixing chamber or to the passenger cabin.

Air-conditioning systems are known in which two of the said systems are provided for reasons of redundancy. Embodiments are furthermore known in which not all components are present in two-fold form, but only those which have a comparatively high selection probability. Such an air-conditioning system in which the shaft devices are present in two-fold form, but the stagnation air heat exchanger and the water extractor circuit only in single form, is known from EP 0 891 279 B1.

A further development of the system known from this printed specification is the subject of DE 102 01 426. The air-conditioning system disclosed in this specification has at least one heat exchanger arranged in a stagnation air passage for the cooling of compressed air. The heat exchanger includes at least one first heat exchange unit and one second heat exchanger unit separate therefrom on the compressed air side of which a respective one is in communication with a respective one of the shaft devices on the compressed air side. The shaft devices have compressors which are in communication on the outlet side with the inlet on the compressed air side of the separate heat exchanger units on the compressed air side. The heat exchanger units each have their own compressed air supply.

A common stagnation air inlet passage and stagnation air outlet passages separate from one another in a mechanical flow aspect are provided for the at least two heat exchanger units.

A particularly compact and simultaneously reliable, redundant and cost-favorable arrangement is achieved by the air-conditioning system disclosed in DE 102 01 426 A1.

In the previously described air-conditioning system, the compressed air supplied to the system is taken from the engines. The tapping of the fresh air to be treated directly from the engine is, however, problematic to the extent that as a rule, an unwanted reduction in engine power is associated with the tapping of the air from the engine.

SUMMARY OF THE INVENTION

It is therefore the object of the present invention to further develop an air-conditioning system such that the disadvantages induced by the tapping of engine air are avoided.

This object is solved by an air-conditioning system and a method for the preparation of air for the air-conditioning of a space having the features herein. Advantageous aspects of the invention are also the subject herein.

Provision is made in accordance with the invention for the compressor to be acted on at the inlet side by stagnation air or by environmental air and for one or more motors to be provided by means of which the compressors can be driven. In accordance with the invention, no air tapped from the engines is thus supplied to the compressors, but rather only stagnation air or environmental air which is compressed in the compressors and is then supplied to the respective heat exchanger unit. In this process, one or more motors are provided by means of which the compressors can be driven. The motors are required to supplement the power of the compressors provided by an expansion stage or, in the case of the bypass of the expansion stage, to ensure the operation of the compressors.

The air-conditioning system in accordance with the invention has the advantage in a preferred aspect of the invention that it manages without any tapped air from the engines. This system is only supplied with stagnation air or environmental air and indeed both as air to be prepared for the air-conditioning of the space and as a cooling medium for the air to be prepared.

In a further aspect of the invention, provision is made for the heat exchanger units to form one constructional unit. They are arranged in the common stagnation air passage.

Provision can be made for at a common stagnation air passage to be provided for the at least two heat exchanger units, with a stagnation air passage inlet valve, whose position is adjustable, being provided for the purpose of changing the stagnation air current and thus of the cooling power of the heat exchanger units.

In a further aspect of the invention, a common stagnation air passage is provided for the at least two heat exchanger units. One or more blowers with motor drive can be provided in said common stagnation air passage. They provide the maintenance of a flowing through of the stagnation air passage in ground operation and ensure the cooling power of the heat exchanger units arranged in the stagnation air passage. It is likewise possible to provide separate stagnation air outlet passages for the at least two heat exchanger units. One, or preferably two or more, blowers with motor drive can be arranged in each of the stagnation air outlet passages separate from one another and starting directly at the outlet side of the heat exchanger units.

The blowers can be arranged in partial regions of the stagnation air outlet passage separate from one another in a mechanical flow aspect. This separation of the stagnation air outlet passage in a mechanical flow aspect preferably relates only to a partial region of the stagnation air outlet passage and advantageously not to the region directly adjoining the heat exchanger units. Provision can be made for check valves to be provided downstream of the blowers which prevent a backflow taking place in the partial regions of the stagnation air outlet passage supplied by the blowers in the event of the failure of one of the blowers to prevent the blower in operation from conveying air over the stationary blower and not through the heat exchanger units.

To increase the transmission of the stagnation air passage, provision can be made for one or more blower bypasses—likewise provided with check valves—to be arranged in the stagnation air passage. At least one bypass can be arranged, for example, between the partial regions of the stagnation air outlet passage supplied by the respective blowers.

In a further aspect of the invention, provision is made for the compressors to be multi-stage compressors of which the first stage is acted on by stagnation air or environmental air at the inlet side and of which the last stage is in communication on the outlet side with the inlet of the heat exchanger units at the compressed air side. Two-stage compressors or also multi-stage compressors can be used, for example.

The shaft devices can have at least one compressor, one turbine as an expansion stage and one motor. The motor for the drive of the compressor is thus preferably a component of a shaft device.

In a further aspect of the invention, each of the shaft devices is in communication with one respective water extractor circuit. The water extractor circuits serve the dehumidification of the air supplied to the expansion stage. Provision can generally also be made for one common water extractor circuit to be provided for the plurality of shaft devices.

It can be necessary, in particular at high altitudes, not to guide the air flowing from the heat exchanger unit on the compressed air side through the water extractor circuit and the expansion stage in order to ensure a sufficient transmission of the system and to ensure that the compressor power is sufficient to ensure sufficient cabin pressurization. In this case, the cooling power is not produced by the expansion stage, but substantially by the heat exchanger unit. A bypass of the water extractor circuit is possible since the air at fairly high altitudes is comparatively dry and water extractor is therefore not absolutely necessary. To ensure sufficient cooling of the cabin air in particular in this case, provision can additionally be made for a cabin air circuit to be operated in which measures are arranged for the removal of heat from the air guided in the circuit. The means for the removal of heat can be of any desired design. They can include a heat exchanger or also an evaporator, through which suitable refrigerants are guided.

It is particularly advantageous in this process for the heat exchanger to have a further heat exchanger unit which can be acted on by stagnation air or environmental air and which is not in communication with the first or the second heat exchanger unit on the compressed air side. This heat exchanger unit can be made as a condenser and be in communication with the evaporator. The evaporator and the condenser can be components of a closed refrigerant circuit.

In a further aspect of the invention, one or more bypass lines are provided which extend from the outlet side of the heat exchanger units to the outlet side of the expansion stages and which can each be shut off by means of a valve arranged therein. The bypass lines serve to increase the transmission of the system at high altitudes. In this operating mode, it can be necessary to provide a bypass in particular of the water extractor system and/or of the turbine in order to keep the pressure loss of the compressor outlet air as low as possible. In this case, the air cooled in the heat exchanger units is fed in by means of the bypass preferably downstream of the turbine, preferably downstream of the condenser of the water extractor circuit and is then supplied to a mixing chamber or to the passenger cabin.

In a further aspect of the invention, the turbine is in communication at the inlet side, via a line closable by a valve, with the cabin or with the mixing chamber connected upstream of it and at the outlet side, via a line closable by a valve, with the environment, with means being provided by which the turbine can be blocked from the lines carrying the air compressed in the compressor. The means can be made as valves which are arranged in the inlet line connecting the turbine to the water extractor circuit and in the outlet line connecting the turbine to the mixing chamber or to the cabin.

The present invention furthermore relates to a method for the preparation of air for the air-conditioning of a space, in particular for the air-conditioning of a passenger cabin of an airplane. In a first operating mode, the air cooled in the heat exchanger units is supplied to a water extractor circuit, is expanded in an expansion stage and is guided into the space to be air-conditioned or to a mixing chamber upstream thereof. Provision is made, in particular at high altitudes, in a second operating mode for the air cooled in the heat exchanger units to be guided directly into the space to be air-conditioned or into a mixing chamber upstream thereof while bypassing the water extractor circuit and/or the expansion stage.

As stated above, the first operating mode is preferably to be used in ground operation or at fairly low altitudes and the second operating mode is preferably to be used at fairly high altitudes.

The cooling power for the cooling of the air supplied to the heat exchanger units by means of stagnation air or environmental air can be controlled or regulated by the change of the position of a stagnation air inlet valve and/or by the change of the operation of blower arranged in the stagnation air outlet passage.

Provision can be made for the increase of the cooling power for the cabin air to be guided at least partly in the circuit and for this to be subjected to a cooling process. Provision is made in an advantageous aspect of the invention for the cooling to take place by means of a cooling medium which is guided in the circuit, with heat being removed from the cooling medium in a heat exchanger unit arranged in the stagnation air passage of the air-conditioning system. Provision can be made in this process for the temperature and pressure conditions to be selected such that the cooling medium condenses in the heat exchanger unit. To utilize the energy content of the cabin air, provision can be made in a further aspect of the invention for cabin air to be expanded via the turbine and then supplied to the environmental air in the second operating mode.

The invention further relates to an air-conditioning system, in particular to an air-conditioning system for the air-conditioning of a passenger cabin of an airplane, having at least one heat exchanger arranged in a stagnation air passage with at least one shaft device in communication with the heat exchanger at the compressed air side with at least one compressor acted on by stagnation air or environmental air at the inlet side and at least one turbine, having at least one motor for the driving of the compressor, having a turbine bypass line for the bypassing of the turbine at the compressed air side and having at least one control device by means of which the air-conditioning system can be operated in a first operating mode in which the compressed air is expanded in the turbine and can be operated in a second operating mode in which the compressed air is predominantly or completely guided through the turbine bypass line, with the control device being in communication with the motor and being designed such that the motor is operated in the first operating mode, such that the motor power is used for cooling purposes and for pressurization and is operated in the second operating mode such that the motor power is used for the compression of the stagnation or of the environmental air.

Provision can be made in this process for the first operating mode to be used in ground operation or at low altitudes and for the second operating mode to be used in contrast at fairly high altitudes.

In a preferred aspect of the invention, the air-condition system is designed in accordance with the description herein.

Such an air-conditioning system has the advantage that the available motor power of the compressor motor is not largely unused, in particular in ground operation or at fairly low altitudes, but is predominantly or exclusively used for the cooling and for the pressurization of the cabin, i.e. for the compression of the stagnation air or of the environmental air. The motor can, for example, be operated in the range of 80% to 100% of its maximum power. The cooling is achieved by the expansion of the correspondingly compressed air in the turbine of the shaft device. At fairly high altitudes, the available motor power is substantially or exclusively used for the compression of the environmental air to the cabin pressure level, i.e. for the cabin pressurization. The cooling in flight takes place by the stagnation air heat exchanger and by an optional circulating air cooling.

The air-conditioning system has the advantage that the power of the compressor motor is also predominantly or exclusively used for cooling in ground operation or at lower altitudes so that the cabin air circuits 100 visible from FIG. 2 can be made with correspondingly reduced cooling power. A further advantage results from the fact that a water extractor circuit upstream of the turbine is usable in the first operating mode so that a dehumidification is, for example, also possible in ground operation.

The invention furthermore relates to a method for the preparation of air for the air-conditioning of a space, in particular for the air-conditioning of a passenger cabin of an airplane, comprising the following steps: compression of environmental air or of stagnation air in a compressor unit driven by means of a motor and supply of the compressed air to a heat exchanger, cooling of the air supplied to the heat exchanger by stagnation air or environmental air, with the air cooled in the heat exchanger being expanded in an expansion stage in a first operating mode, with the air cooled in the heat exchanger being predominantly or completely guided around the expansion stage in the bypass in a second operating mode and with the motor power being used for cooling purposes and for pressurization in the first operating mode and with the motor power being used for the compression of the stagnation air or the environmental air in the second operating mode.

Provision can be made in the first operating mode for the cooling of the air to take place by the stagnation air heat exchanger(s) and by the expansion of the compressed air in the turbine. Provision can be made in the second operating mode for the cooling of the air to take place by the stagnation air heat exchanger(s) and a circulating air cooling.

Provision can be made for the available motor power to be used predominantly or exclusively for cooling purposes and for the pressurization of the cabin or of another space to be pressurized in the first operating mode and for the available motor power to be used predominantly or exclusively for pressurization, i.e. for the compression of the environmental air or stagnation air to the level of the space to be pressurized, in particular the cabin, in the second operating mode.

In a further aspect of the invention, the available motor power can correspond to the value of the motor power which is to be generated by the motor at maximum altitude when the turbine is operated in bypass, i.e. is not available for the drive of the compressor. In a preferred aspect of the invention, this operating state determines the configuration of the compressor engine.

In already known systems, the power of the compressor motor available as such in ground operation and at fairly low altitudes is largely unused. Provision is made in a preferred aspect of the invention for the motor to be operated at more than 50% of the available motor power, preferably at above 70%, and particularly preferably in the range from 70-80% of the available motor power, in ground operation.

BRIEF DESCRIPTION OF THE DRAWINGS

Further details and advantages of the invention will be explained with reference to an embodiment shown in the drawing. There are shown.

DESCRIPTION OF THE PREFERRED EMBODIMENTS

Figure 1:
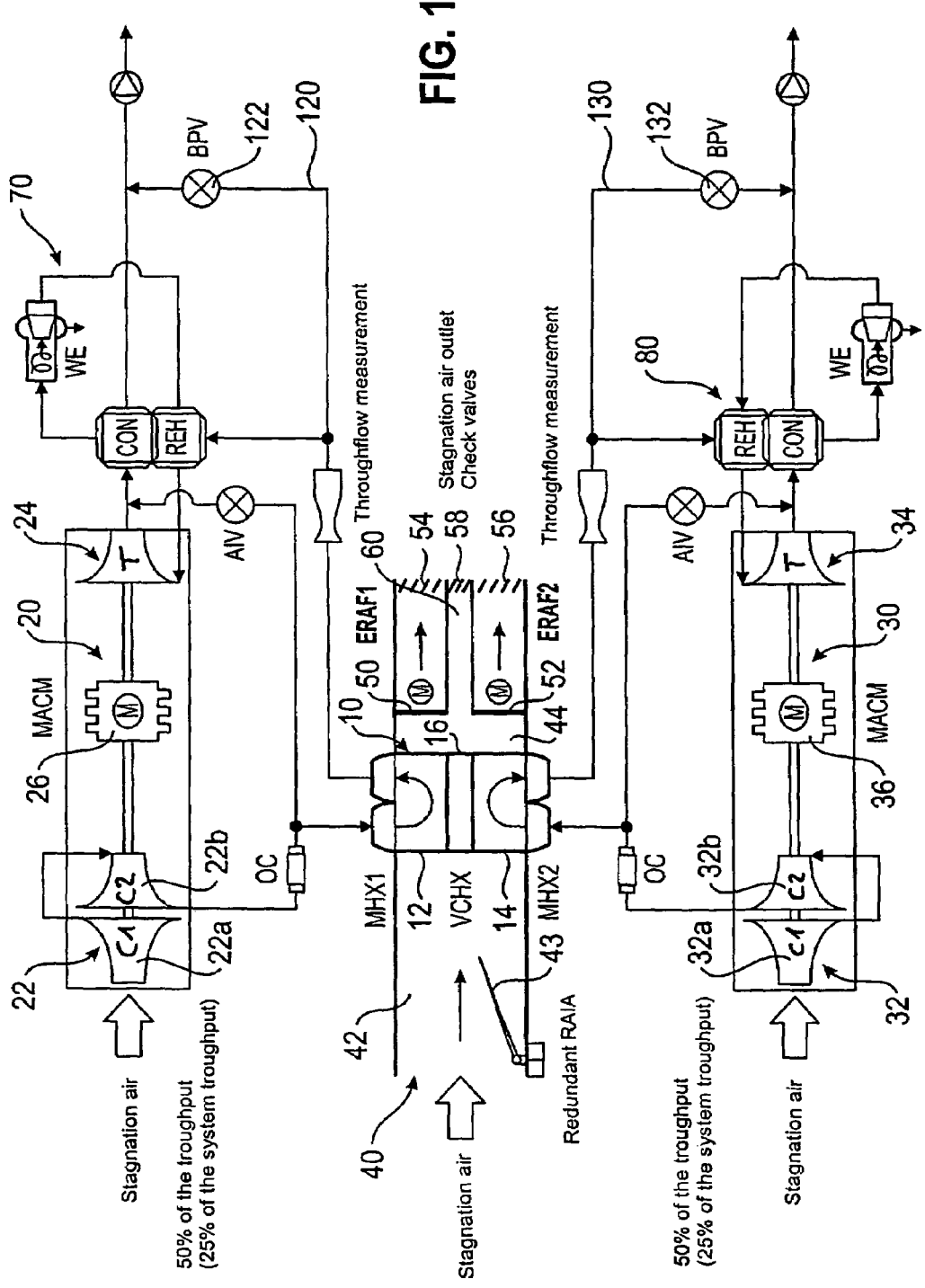
FIG. 1: a schematic representation of an air-conditioning system in accordance with the invention.

FIG. 1 shows a schematic representation of an air-conditioning system having two motor-powered shaft devices 20, 30 which each consist of a two-stage compressor 22, 32 of a turbine 24, 34 and of an electric motor 26, 36 for the supplementary driving of the compressors 22, 32. The shaft devices are provided with the designation MACM in the figures.

The air-conditioning system furthermore has a common stagnation air passage 40 in which the heat exchanger units 12, 14 separate from one another on the compressed air side are arranged which are furthermore given the designations MHX1 and MHX2 in the Figures. A further heat exchanger unit 16 is located between the heat exchanger units 12, 14 separate on the compressed air side and is not in communication with any of the heat exchanger units 12 or 14 on the compressed air side and is furthermore given the designations VCHX and VCCon in the Figures. The further heat exchanger unit 16 can be located between the two heat exchanger units 12, 14 or, for example, also at the marginal region of the stagnation air passage 40. The arrangement of the heat exchanger units 12, 14, 16 is as desired. The heat exchanger units 12, 14, 16 form the heat exchanger 10.

The blowers 50, 52, which are also given the short designations ERAF 1 and ERAF 2, are arranged downstream of the heat exchanger in the stagnation air passage 44. The blowers 50, 52 are driven by an electric motor.

As can be seen from FIG. 1, the blowers 50, 52 are located in partial regions of the stagnation air passage 44 separated from one another by walls in a mechanical flow manner. The blower bypass 60, which serves the increase of the transmission during flight, is located between these partial regions.

The check valves 54, 56 and 58 are located downstream of the blowers 50, 52 and in the outlet region of the bypass passage 60.

The stagnation air passage inlet valve 43 (duplex RAIA) is located on the inlet side of the stagnation air inlet passage 42.

The shaft devices are in communication with the water extractor circuits 70, 80. The latter consist in a known manner of a reheater (REH), a condenser (CON) and a water extractor (WE).

The reheaters (REH) are in communication with the outlet sides of the heat exchanger units 12, 14. Measuring elements (venturi) are located in the connection lines for the measurement of the volume flow of the air leaving the heat exchanger units 12, 14.

As can furthermore be seen from FIG. 1, bypass lines 120, 130 are provided which extend from the outlet side of the heat exchanger units 12, 14 to the turbine outlet side and which can be shut off by means of a valve 122, 132 (BPV) arranged therein.

To avoid any icing at the turbine outlet side or in the condenser (CON) or to keep it within limits, a bypass line is furthermore provided which extends from the compressor outlet side to the turbine outlet side and which can be shut off with a valve (AIV=anti-icing valve).

The operation of the air-conditioning system shown in FIG. 1 is as follows:

The compressors 22, 32 are acted on by environmental air or stagnation air. The compressor power is generated by the turbines 24, 34, on the one hand, and in a supplementary manner by the electric motors 26, 36. These components together form one each of the shaft devices 20, 30. The compressed air flows separately into a respective one of the heat exchanger units 12, 14 arranged in the common stagnation air passage 40 and is then cooled by means of the stagnation air or environmental air guided in the stagnation air passage 40.

The air cooled in this manner moves into the reheater (REH) after passing the throughflow device (venturi) and subsequently into the condenser (CON) in which the humidity contained in the air is condensed to a large extent. The condensed water is extracted in the water extractor (WE). The air is then guided through the reheater, is slightly heated and subsequently expanded in the turbines 24, 34. The air is strongly cooled in this process. The air cooled in this manner serves the cooling of the condenser (CON) and is slightly heated in this process. It subsequently moves via a check valve into a mixing chamber or into the passenger cabin.

Figure 3A:
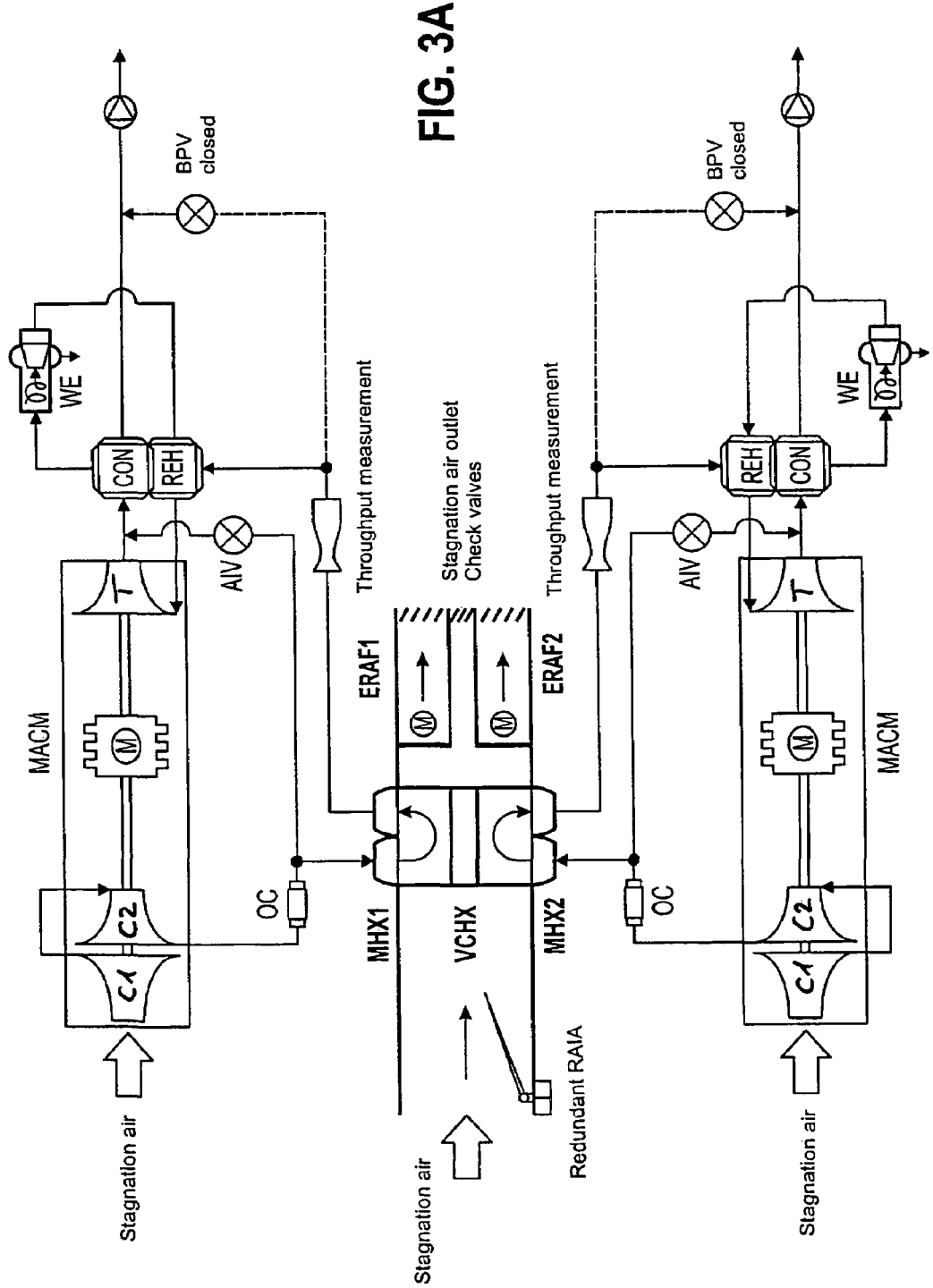
FIG. 3a: a schematic representation of the air-conditioning system in accordance with FIG. 1 in a first operating mode.

This operating mode, which is in particular used in ground operation or at fairly low altitudes, is shown in FIG. 3*a*.

The cooling of the air supplied to the heat exchanger units 12, 14 takes place via stagnation air or environmental air which flows into the stagnation air passage 42 after passing through the adjustable stagnation air passage inlet valve 43 and then flows through the heat exchanger units 12, 14, 16.

Blowers 50, 52, which are arranged in partial regions of the stagnation air outlet passage 44 separate from one another in a mechanical flow manner, are located downstream of the heat exchanger units 12, 14, 16. Provision is made that the separation of the stagnation air outlet passage 44 in a mechanical flow manner does not take place in the region adjacent to the heat exchanger 10, but downstream thereof. This has the advantage over a throughgoing separation of the stagnation air outlet passage 44 in a mechanical flow manner that even if one blower 50, 52 fails, the other blower can convey air through all heat exchanger units 12, 14, 16.

The blowers 50, 52 are driven by electric motors and in ground operation serve the conveying of environmental air through the stagnation air passage 40. In flight operation, the flowing through of the stagnation air passage 40 takes place due to the stagnation pressure. The bypass passage 60 is provided to increase the transmission of the system in this process.

To ensure the flow through the heat exchanger 10 and to avoid backflows, the check valves 54, 56, 58 are provided at the outlet side in the end region of the stagnation air outlet passage 44.

Figure 3B:
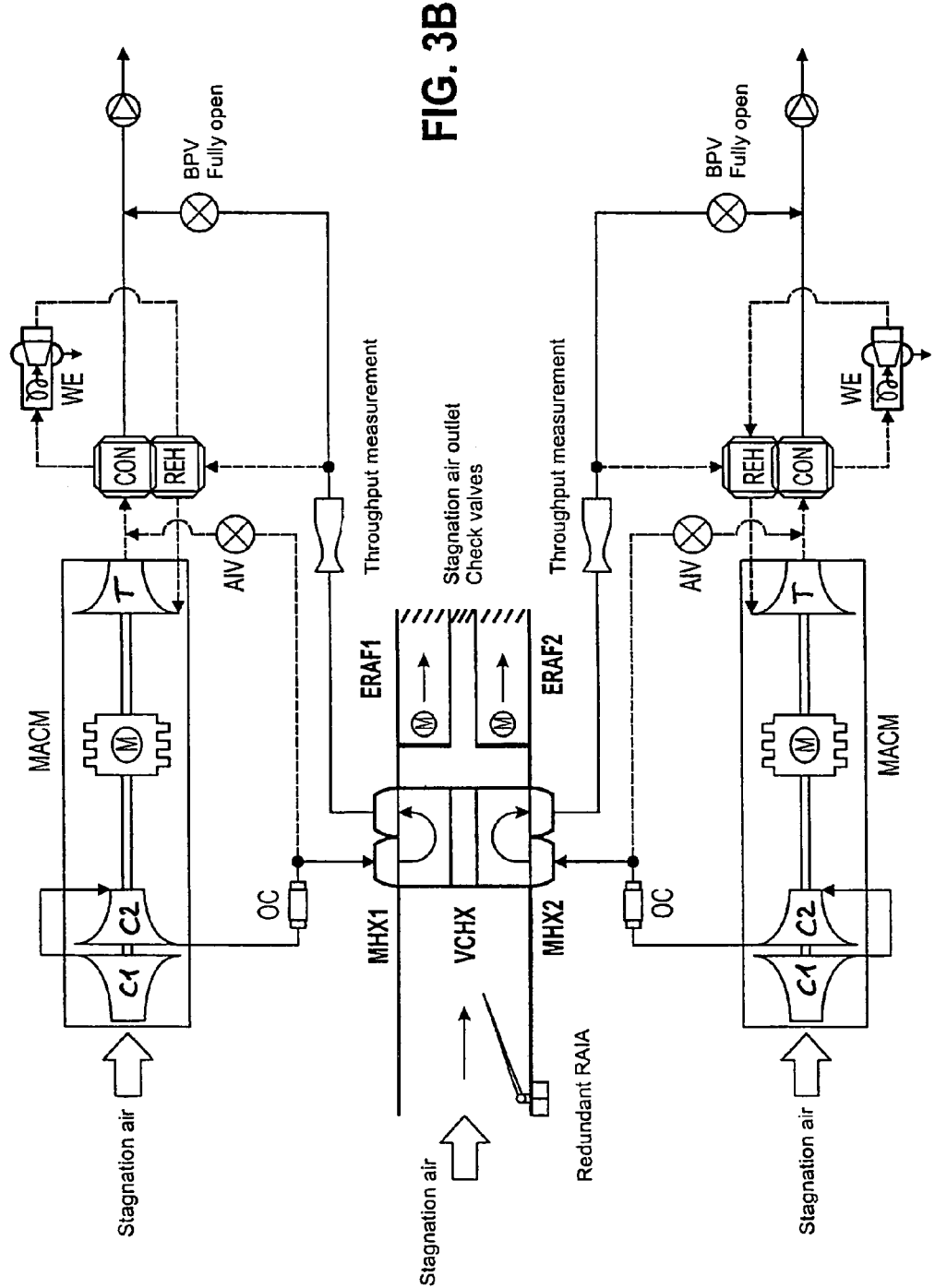
FIG. 3b: a schematic representation of the air-conditioning system in accordance with FIG. 1 in a second operating mode.

At fairly high altitudes, in accordance with the operation shown in FIG. 3*b*, the valves 122, 132 are opened to ensure a bypass of the water extractor circuit 70, 80 and the turbines 24, 34 by means of the bypass lines 120, 130. In this case, the cooling does not takes place by means of the turbines 24, 34, but rather by means of the heat exchanger units 12, 14 through which the air flows after its compression in the compressors 22, 32. On the outlet side, the air is then guided via the bypass lines 120, 130 into the outlet lines of the turbines 24, 34 or into the inlet lines of the mixing chamber or the passenger cabin. At high altitudes, the cooling can be sufficient without the use of the turbines 24, 34, since the supplied stagnation air is very cold.

The driving of the compressors 22, 32 in this operating mode takes place only by means of the motors 26, 36 due to the bypass of the turbines 24, 34.

Figure 2:
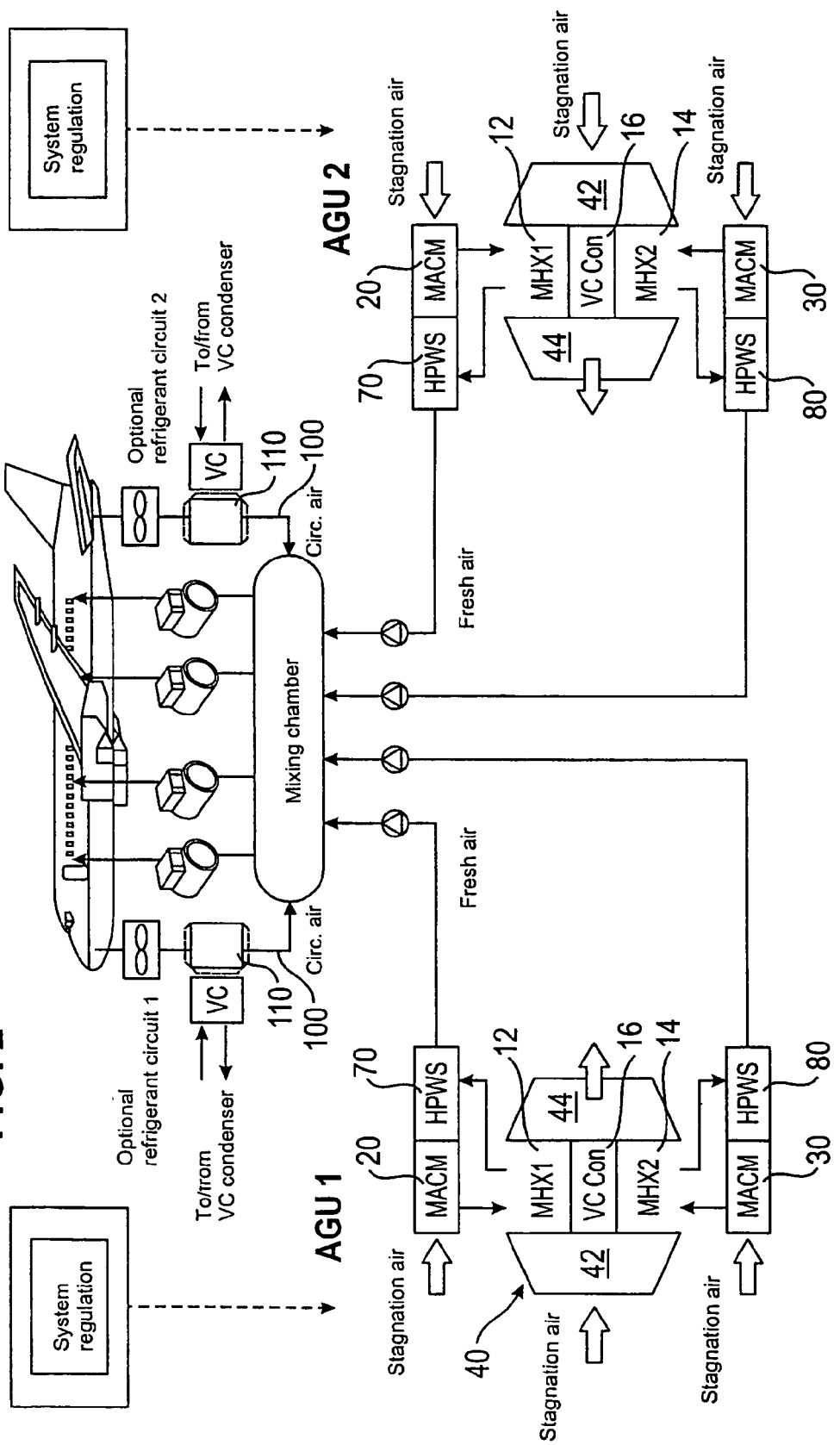
FIG. 2: a schematic representation of an air-conditioning system with two air-conditioning systems in accordance with FIG. 1.

FIG. 2 shows two of the air-conditioning systems in accordance with FIG. 1 with the designations (AGU1 and AGU2). FIG. 2 further shows the mixing chamber (mixer unit) which is disposed upstream of the passenger cabin and into which the outlet air of the air-conditioning system in accordance with FIG. 1 is led. The system in accordance with FIG. 2 thus contains 4 equal fresh-air supplies.

The cabin air circuits 100 can further be seen from FIG. 2, by means of which air is led from the cabin, cooled and then supplied to the mixing chamber by means of a blower. The cabin air circuits 100 each include an evaporator 110 which forms a component of a refrigerant circuit together with the heat exchanger units 16 designed as a condenser. Provision is made in this process for the refrigerant to be evaporated in the evaporator 110 and to remove heat from the cabin air guided in the circuit. The evaporated refrigerant is condensed in the heat exchanger unit 16 and emits heat to the stagnation air flow flowing through the stagnation air passage 40.

As can further be seen from FIG. 2, electrical heating apparatus can be provided between the mixing chamber and the cabin to bring the cabin air to the desired nominal value in accordance with the different cabin requirements.

It results from FIGS. 1 and 2 that the whole air-conditioning system manages without any tapped air from the engines or from an auxiliary unit. In this embodiment, both the fresh air supplied to the cabin and the air led through the stagnation air passage for cooling consist exclusively of environmental air or stagnation air.

The shaft devices can be arranged parallel to one another. The stagnation air passage can be located between the shaft devices. The stagnation air inlets or the environmental air inlets for the shaft devices can be located in the region next to the stagnation air inlet passage.

The heat exchanger units can be arranged next to one another in the flow direction or also over one another. It is furthermore possible to provide the link of the shaft devices to the heat exchanger units at the side of or below the heat exchanger units. Reverse arrangements with shaft devices arranged above the heat exchanger units are naturally also feasible. It is likewise furthermore possible, as required, not to arrange the shaft devices and the heat exchanger units at right angles to one another, but rather different from this, for example, at an angle of 45°.

As can be seen from FIG. 1 and FIG. 2, the main components of each flow path for fresh air to be prepared are the motor-powered shaft device, the heat exchanger unit, a water extractor circuit, the bypass line with bypass valve, the anti-icing valve and the flow measurement.

The common components of the fresh air paths are the stagnation air passage inlet valve, the stagnation air passage with check valves, the electrically driven blowers, the cooling system for the cabin air guided in the circuit and a control or monitoring unit.

To ensure an optimum cabin temperature management, the electrical heating apparatus shown in FIG. 2 can be provided, with one heating apparatus being able to be provided per cabin region. Provision can furthermore be made for hot compressing air to be branched off downstream of the compressor. This air is then mixed via valves with the cold air flowing from the mixing chamber into the passenger cabin.

The temperature increase of the fresh air required for the heating operation is achieved via compression in the compressors. As discussed above, additional electrical heating apparatus can be used.

The temperature control of the total systems is achieved by the corresponding change of operation of the blowers 50, 52 (in ground operation, via the open position of the stagnation air passage inlet valve 43, via the electrical heating apparatus and by means of the cooling of the cabin air guided in the circuit.

To prevent any icing or to keep it within limits, provision can be made for the corresponding valve AIV to be open temporarily in order to guide hot compressor outlet air into the outlet region of the turbines.

Figure 4:
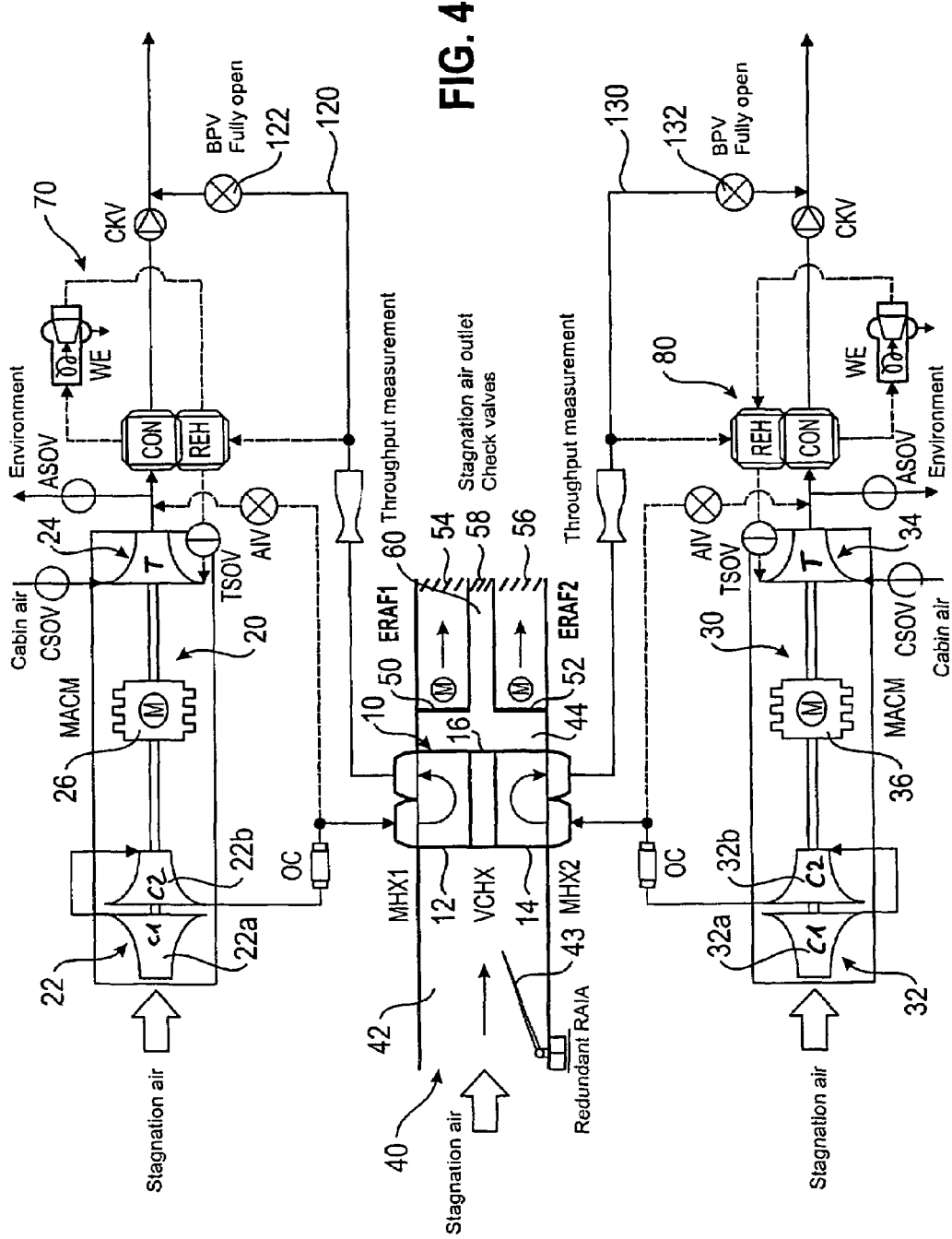
FIG. 4: a schematic representation of an air-conditioning system in accordance with the invention with use of the cabin air.

FIG. 4 shows a schematic representation of an air-conditioning system in accordance with the invention utilizing the vitiated cabin air. In airplanes, the cabin is pressurized in flight to achieve the required environmental conditions for people. The difference between cabin pressure and environmental pressure increases with increasing altitude due to the environmental pressure falling with the altitude. The cabin air is led to the environmental air in that it is uselessly expanded via the valves.

It has therefore been proposed to provide a system for the utilization of vitiated cabin air (cabin air recovery (CAR)) by means of which the energy content of the vitiated cabin air is used. The vitiated cabin air is first expanded via a turbine and then passed on to the environment. The power created in this process can e.g. be utilized directly for the driving of a compressor or also for power generation by means of a generator.

FIG. 4 shows the use of such a system in an air-conditioning system in accordance with the present invention. As can be seen from FIG. 4, the vitiated cabin air can be guided to the inlet side of the turbine T through a corresponding connection line. This line can be shut off by means of the valve CSOV (cabin shut-off valve). On operation of the cabin air recovery at fairly high altitudes, this valve is opened to lead the vitiated cabin air into the turbine T.

The shut-off valve TSOV (turbine shut-off valve) is located in the connection line between the water extractor circuit and the turbine inlet. The check valve (CKV) is furthermore located in the outlet line of the turbine. This valve is arranged upstream of the opening of the bypass line in the turbine outlet line, as can be seen from FIG. 4. The valves TSOV and CKV are closed during cabin air recovery to prevent the mixing of fresh air with the vitiated air.

A line branches off from the turbine outlet line, with the valve ASOV (ambient shut-off valve) being arranged therein. This valve is open during the cabin air recovery, whereby the turbine outlet air is led to the environment and not into the condenser CON or into the mixing chamber.

In the operating mode shown in FIG. 4 in which the air compressed in the compressor C is supplied to the mixing chamber via a turbine bypass, the turbine T can be used for the cabin air recovery. In this process, cabin air flows via the open valve CSOV into the turbine, is expanded there and released to the environment via the outlet line with the open valve ASOV. The closed valves TSOV and CKV prevent a mixing of the vitiated cabin air with the fresh air to be supplied to the cabin.

As can be seen from FIG. 4, such a system is provided for each of the shaft devices MACM.

The available shaft power from the expansion of the vitiated cabin air via the turbine T falls with the altitude. This corresponds to the demands for the compression which likewise increase with the altitude, since there is a larger pressure difference between the cabin and the environment.

FIG. 2 shows an aspect of the invention in which two heat exchanger units MHX 1, MHX 2 are combined in one stagnation air passage per air-conditioning system (AGU 1, 2). The obvious system configurations resulting from this are thus 2 or 2+2 or 2+2+2, etc. heat exchanger units.

The invention is, however, not restricted to two heat exchanger units per stagnation air passage or per AGU. Three or more than three heat exchanger units can rather also be provided. It is equally generally feasible for only one heat exchanger unit, i.e. one heat exchanger, to be provided.

The present invention can generally be made with one or two ore more heat exchangers. Provision can be made for each of these heat exchangers to be arranged in its own stagnation air passage. Provision can be made for each of the heat exchangers to be in communication with a shaft device on the compressed air side. It is also feasible for two or more than two heat exchangers to be arranged in a stagnation air passage.

Figure 5:
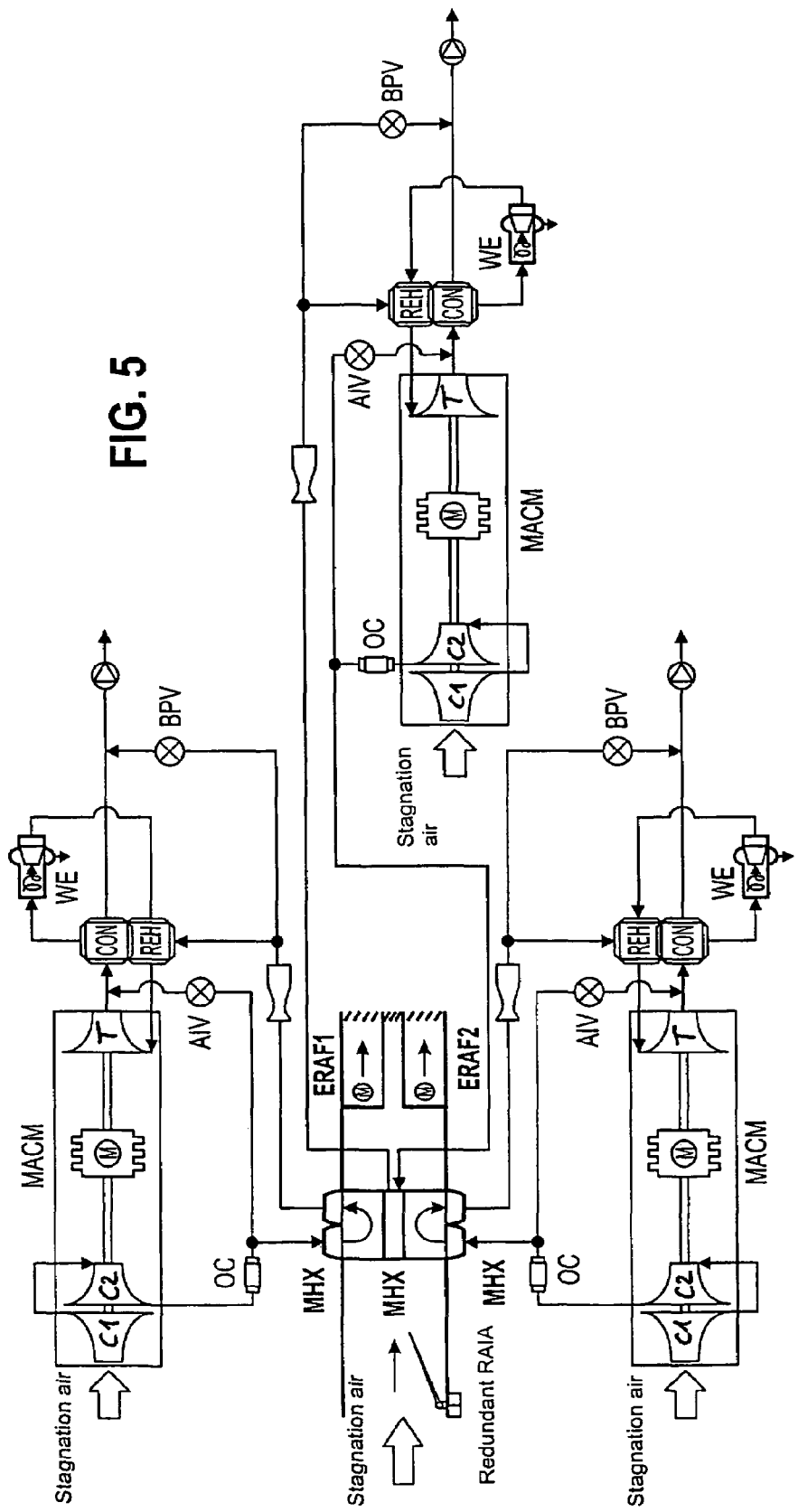
FIG. 5: a schematic representation of an air-conditioning system in accordance with the invention having three stagnation air heat exchangers and three shaft devices.

FIG. 5 shows a corresponding architecture in which the stagnation air heat exchanger consists of three heat exchanger units separate on the compressed air side, of which each is in communication with one of the shaft devices MACM on the compressed air side, as can be seen from FIG. 5. FIG. 5 shows an architecture with three shaft devices MACM. In addition to such an architecture, systems are naturally also feasible with more than three stagnation air heat exchanger units in the stagnation air passage. Accordingly, more than three shaft devices can also be used. The shaft devices in communication with the heat exchanger units can be made identically or also differently from one another. FIG. 5 shows a system with three identical shaft devices or identical circuit design of the shaft devices. The compressors of the shaft devices are acted on by stagnation air or by environmental air. After the compression, the air is supplied to the compressed air side of the heat exchanger units. The separation of water subsequently takes place in a water extractor circuit. The air dehumidified in this manner is expanded in the turbine and then supplied to the cabin or to a mixing chamber. As can be further seen from FIG. 5, all three shaft devices are made with a turbine bypass which can be shut off by means of the valve BPV and which connects the outlet of the heat exchanger units on the compressed air side to a connection line between the condenser and the mixing chamber or the cabin.

The invention claimed is:

1. An air-conditioning system, in particular an air-conditioning system for the air-conditioning of a passenger cabin of an airplane, having at least one heat exchanger arranged in a stagnation air passage, having at least one shaft device in communication with the heat exchanger at the compressed air side with at least one compressor acted on by stagnation air or environmental air at the inlet side and at least one turbine, having at least one motor for the driving of the compressor, having a turbine by-pass line for the bypassing of the turbine at the compressed air side and having at least one control device by means of which the air-conditioning system can be operated in a first operating mode in which the compressed air is expanded in the turbine and can be operated in a second operating mode in which the compressed air is guided predominantly or completely through the turbine bypass line, with the control device being in communication with the motor and being made such that the motor is operated in the first operating mode such that the motor power is used for cooling purposes and for pressurization and is operated in the second operating mode such that the motor power is used for the compression of the stagnation air or environmental air, said air conditioning system having at least one measuring device for measuring the throughflow of air from the heat exchanger.

2. An air-conditioning system in accordance with claim 1, having at least two heat exchanger units which form one constructional unit.

3. An air-conditioning system in accordance with claim 2, wherein a common stagnation air passage is provided for the at least two heat exchanger units.

4. An air-conditioning system in accordance with claim 3, wherein a stagnation air passage inlet valve whose position is adjustable is provided in the stagnation air inlet passage.

5. An air-conditioning system in accordance with claim 2, wherein a common stagnation air outlet passage is provided for the at least two heat exchanger units.

6. An air-conditioning system in accordance with claim 1, wherein at least two motor-driven blowers are provided in the stagnation air outlet passage.

7. An air-conditioning system in accordance with claim 6, wherein check valves are provided downstream of the blowers.

8. An air-conditioning system in accordance with claim 5, wherein one or more blower bypasses provided with a check valve are arranged in the stagnation air outlet passage.

9. An air-conditioning system in accordance with claim 1 comprising at least two compressors, wherein the compressors are multi-stage compressors of which the first stage is acted on by stagnation air or environmental air at the inlet side and the last stage is in communication at the outlet side with the inlet of the heat exchanger units at the compressed air side.

10. An air-conditioning system in accordance with claim 2 comprising at least two shaft devices, wherein the shaft devices each have at least one compressor, turbine and motor.

11. An air-conditioning system in accordance with claim 1 comprises at least two shaft devices, wherein each of the shaft devices is in communication with a respective water extractor circuit.

12. An air-conditioning system in accordance with claim 1 wherein the heat exchanger includes a first heat exchanger unit and a second heat exchanger unit separate from the first heat exchanger unit, and has a further third heat exchanger unit which can be acted on by stagnation air or environmental air and which is not in communication with the first and the second heat exchanger unit (12, 14) at the compressed air side.

13. An air-conditioning system in accordance with claim 1, wherein a cabin air circuit is provided in which means are arranged for the removal of heat from the air guided in the circuit.

14. An air-conditioning system in accordance with claim 13, wherein the means for the removal of heat include a heat exchanger.

15. An air-conditioning system in accordance with claim 13, wherein the means for the removal of heat include an evaporator.

16. An air-conditioning system in accordance with claim 12, wherein a fourth heat exchanger unit is arranged in the stagnation air passage and is made as a condenser and in communication with an evaporator, with the third heat exchanger unit and the evaporator being components of a refrigerant circuit.

17. An air-conditioning system in accordance with claim 12, wherein at least two bypass lines are provided which extend from the outlet side of the first and second heat exchanger units to the outlet side of the turbines and which can each be shut off by means of a valve arranged therein.

18. An air-conditioning system in accordance with claim 1, wherein the turbine (T) is in communication at the inlet side with the cabin or a mixing chamber disposed upstream thereof via a line closable by a valve (CSOV) and is in communication at the outlet side with the environment via a line closable by a valve (ASOV); and wherein means are provided by which the turbine (T) can be closed off from the lines guiding the air compressed in the compressor (C).

19. An air-conditioning system in accordance with claim 18, wherein the means are made as valves (TSOV, CKV) which are arranged in the inlet line connecting the turbine (T) to the mixing chamber or to the cabin.

20. A method for the preparation of air for the air-conditioning of a passenger cabin of an airplane, comprising the steps:
  a) compressing stagnation air or environmental air in a primary compressor unit and a secondary compressor unit, each driven by means of a respective motor and supplying the compressed air from each of said primary and secondary compressor units into a respective one of a first and a second heat exchanger;
  b) cooling of the air supplied to the first heat exchanger and second heat exchanger by stagnation air or environmental air, said first and second heat exchangers being arranged in separate respective air treatment circuits such that air passed through one of said heat exchangers does not pass through the other of said heat exchangers;
  wherein, in a first operating mode, the air cooled in the first heat exchanger is expanded in a first expansion stage without further compression, and air cooled in the second heat exchanger is cooled in a second expansion stage without further compression;
  wherein, in a second operating mode, the air cooled in the first heat exchanger is predominantly or completely guided past the first expansion stage in the bypass without passage through the second heat exchanger and air cooled in the second heat exchanger is predominantly or completely guided past the second expansion stage in the bypass without passage through the first heat exchanger;
  and wherein, in the first operating mode, the motor power is used for cooling purposes and for pressurization and, in the second operating mode, the motor power is used for the compression of the stagnation air or environmental air.

21. A method in accordance with claim 20, wherein the first operating mode of the method is used in ground operation of the airplane and at low altitudes of the airplane and the second operating mode is used in altitudes higher with respect to the former.

22. A method in accordance with claim 20, wherein cooling power on the cooling of the air supplied to the heat exchanger units by stagnation air or environmental air is controlled or regulated by the change of the position of a stagnation air passage inlet valve and/or by the change of the power of blowers arranged in the stagnation air outlet passage.

23. A method in accordance with claim 20, wherein the cabin air is at least partly guided in the circuit and is cooled in the process.

24. A method in accordance with claim 23, wherein the cooling takes place by means of a cooling medium which is guided in the circuit; and wherein heat is removed from the cooling medium in a heat exchanger unit arranged in the stagnation air passage of the air-conditioning system.

25. A method in accordance with claim 20, wherein, in the second operating mode, vitiated cabin air is expanded in a turbine (T) and is then supplied to the environmental air.

26. An air-conditioning system in accordance with claim 1, wherein the control device is made such that the first operating mode is used in ground operation and/or at low altitudes and the second operating mode is used at altitudes higher with respect to the former.

27. The air-conditioning system of claim 1 wherein the measuring device is a venturi element.

28. An air conditioning system for conditioning the air of a passenger cabin of an aircraft, said air conditioning system comprising:
a) a two-part heat exchanger arranged in a stagnation air passage, said two-part heat exchanger having a first section and a second section which is separate from the first section;
b) a first air treatment circuit which includes a first motor driven shaft device having a first compressor and a first turbine, a compressed air line in communication with the first section of the two-part heat exchanger and a first turbine bypass line for bypassing the turbine with at least a portion of the air exiting from the first section of the two-part heat exchanger, wherein in a first mode of operation at least a portion of the air exiting from the first section of the two-part heat exchanger is conducted through the first turbine bypass line, and in a second mode of operation at least a portion of the air exiting the first section of the two-part heat exchanger is conducted into the first turbine; and
c) a second air treatment circuit which is separate from the first air treatment circuit and includes a second motor driven shaft device having a second compressor and a second turbine, a compressed air line in communication with the second section of the two-part heat exchanger and a second turbine bypass line for bypassing the turbine with at least a portion of the air exiting from the second section of the two-part heat exchanger, wherein in a first mode of operation at least a portion of the air exiting from the second section of the two-part heat exchanger is conducted through the second turbine bypass line, and in a second mode of operation at least a portion of the air exiting the second section of the two-part heat exchanger is conducted into the second turbine.

* * * * *